(12) United States Patent
Kim et al.

(10) Patent No.: US 7,227,987 B2
(45) Date of Patent: Jun. 5, 2007

(54) REPRESENTATIVE COLOR DESIGNATING METHOD USING RELIABILITY

(75) Inventors: Hyeon-Jun Kim, Sungnam (KR); Jim-Soo Lee, Seoul (KR); Hee-Youn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 11/185,882

(22) Filed: Jul. 21, 2005

(65) Prior Publication Data

US 2005/0254705 A1    Nov. 17, 2005

Related U.S. Application Data (63) Continuation of application No. 10/633,638, filed on Aug. 5, 2003, now Pat. No. 6,941,010, which is a continuation of application No. 09/479,888, filed on Jan. 10, 2000, now Pat. No. 6,721,447.

(30) Foreign Application Priority Data

Jan. 2, 1999   (KR) ................... 3181/1999

(51) Int. Cl.
*G06K 9/00*   (2006.01)

(52) U.S. Cl. ...................... 382/162; 164/165

(58) Field of Classification Search ................ 382/162, 382/164, 165, 173, 180
See application file for complete search history.

(56) References Cited

U.S. PATENT DOCUMENTS

| 4,414,635 | A | * | 11/1983 | Gast et al. .................. 382/165 |
| 5,170,441 | A | | 12/1992 | Mimura et al. |
| 5,509,111 | A | * | 4/1996 | Hong et al. ................. 345/591 |
| 5,850,473 | A | | 12/1998 | Andersson |
| 6,236,750 | B1 | | 5/2001 | Garber |
| 6,373,979 | B1 | | 4/2002 | Wang |

FOREIGN PATENT DOCUMENTS

| JP | 11-096364 | 4/1999 |
| WO | WO 89/01275 | 2/1989 |

* cited by examiner

*Primary Examiner*—Phuoc Tran
(74) *Attorney, Agent, or Firm*—Ked & Associates, LLP (57) ABSTRACT

A method for designating a representative color which is expressed based on a reliability that a representative color of an image region expresses an image region is disclosed. This method includes a step for expressing a reliability of the representative color value as a color information of the image region together with a representative color value which represents the image region in a method using a color value as an information with respect to an image region, for thereby expressing a color information of an image region using a reliability and a color segmentation method of an image region.

3 Claims, 10 Drawing Sheets

| (C00,S00) | (C01,S01) | (C02,S02) | (C03,S03) | (C04,S04) | (C05,S05) | (C06,S06) | (C07,S07) |
|---|---|---|---|---|---|---|---|
| (C10,S10) | (C11,S11) | (C12,S12) | (C13,S13) | (C14,S14) | (C15,S15) | (C16,S16) | (C17,S17) |
| (C20,S10) | (C21,S21) | (C22,S22) | (C23,S23) | (C24,S24) | (C25,S25) | (C26,S26) | (C27,S27) |
| (C30,S10) | (C31,S31) | (C32,S32) | (C33,S33) | (C34,S34) | (C35,S35) | (C36,S36) | (C37,S37) |
| (C40,S10) | (C41,S41) | (C42,S42) | (C43,S43) | (C44,S44) | (C45,S45) | (C46,S46) | (C47,S47) |
| (C50,S10) | (C51,S51) | (C52,S52) | (C53,S53) | (C54,S54) | (C55,S55) | (C56,S56) | (C57,S57) |
| (C60,S10) | (C61,S61) | (C62,S12) | (C63,S63) | (C64,S64) | (C65,S65) | (C66,S66) | (C67,S67) |
| (C70,S10) | (C71,S11) | (C72,S72) | (C73,S73) | (C74,S74) | (C75,S75) | (C76,S76) | (C77,S77) |

| (C0,S0) | (C10,S10) | | (C11,S11) |
|---|---|---|---|
| | (C12,S12) | | (C13,S13) |
| (C2,S2) | (C300,S300) | (C301,S301) | (C31,S31) |
| | (C302,S302) | (C303,S303) | |
| | (C32,S32) | | (C33,S33) |

FIG. 15

REPRESENTATIVE COLOR DESIGNATING METHOD USING RELIABILITY

This application is a Continuation of application Ser. No. 10/633,638 filed on Aug. 5, 2003, now U.S. Pat. No. 6,941,010, which is a Continuation of application Ser. No. 09/479,888 filed on Jan. 10, 2000, now U.S. Pat. No. 6,721,447, which claims priority to Korean Application No. 3181/1999 filed in Korea on Feb. 1, 1999. The above mentioned documents are incorporated by reference herein.

BACKGROUND OF THE INVENTION

1. Field of the Invention

The present invention relates to a representative color value designating method for an image search system, and in particular to a method for designating a representative color of an image region by expressing a representative color value with respect to an image region together with a reliability which represents an accuracy of the representative color, and to a method for measuring a similarity of more than two images and a method for segmenting an image into similar regions using a feature of a representative color value expressed together with the reliability.

2. Description of the Background Art

In an image search technique, a color information used for an image search is an important factor in the characteristic of images.

In a conventional art, there is a method in which an image is segmented into a n×m number of grids, and a color histogram is obtained with respect to each segmented cell, and a maximum value of the thusly obtained color histogram is determined as a representative color value with respect to a corresponding cell. In another method, an average value of the color histogram is determined as a representative color value of a corresponding cell. In another method, a major color vector is obtained and determined as a representative color value for a corresponding cell.

However, since the characteristics of the images are various, it is difficult to express an image using a color in an image region or one color value. It is improper to express a feature of an image by expressing the image region using one representative color value information. In this case, it is difficult to form an accurate database using the characteristics of images, and the performance of an image search using the thusly formed database is decreased. Furthermore, when expressing a representative color of an image region using various colors instead of one color, a large storing space is required. In addition, it is difficult to accurately express an interrelationship between various colors. Therefore, a representative color value of the thusly determined image region has a low accuracy.

SUMMARY OF THE INVENTION

Accordingly, it is an object of the present invention to provide a method for designating a representative color which is expressed based on a reliability that a representative color of an image region expresses an image region.

It is another object of the present invention to provide a method for expressing a color information of an image region using a reliability and a color segmentation method of an image region.

It is still another object of the present invention to provide a representative color designating method which may be used for an image search based on a weight in accordance with a reliability.

To achieve the above objects, there is provided a representative color designating method which comprises a step for expressing a reliability of the representative color value as a color information of the image region together with a representative color value which represents the image region in a method using a color value as an information with respect to an image region.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention is directed to a method for designating a representative color of an image color based on a reliability that a representative color accurately expresses an image region when designating a representative color with respect to a certain image region. In addition, the present invention is directed to a method for determining a reliability in accordance with a mixed rate and color similarity of colors of an image region.

In addition, the present invention is directed to a method for obtaining a similarity between images by comparing a representative color and reliability of each cell with respect to more than two image regions by obtaining a representative color and reliability with respect to each grid cell after segmenting an image region into multiple grids.

Furthermore, the present invention is directed to a color segmentation method for segmenting an image into regions having the same color in accordance with a reliability degree by expressing a representative color and reliability of an image region.

The embodiments of the present invention will be explained with reference to the accompanying drawings.

Figure 1:
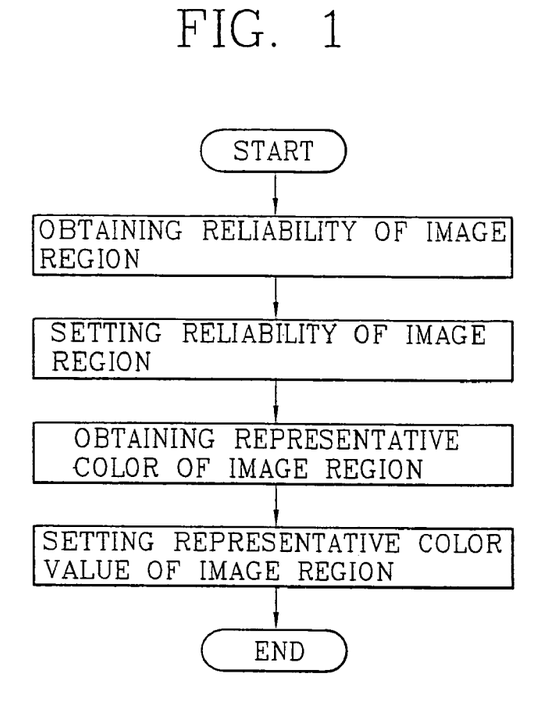
FIG. 1 is a flow chart of a representative color designating method using a reliability according to the present invention.

FIG. 1 is a flow chart of a representative color designating method using a reliability which includes a step for obtaining a reliability of an image region, a step for setting the thusly obtained reliability with respect to the image region as a reliability of the above-described region, and a step for setting a representative color value of the image region together with the reliability.

In the present invention, the reliability is an information representing an accuracy of a color value representing a certain region for an entire image or a certain portion within the image and is a value on whether a certain region expresses one color and is an accuracy when a corresponding region is expressed by the color and has a value between 0 and 1.

Therefore, assuming that the image region is formed of one color and the color is designated as a representative color of the region, the reliability of the representative color is 1. While, if the image region consists of different clear colors and one color among the different clear colors is designated as a representative color, the reliability becomes 0.

In addition, even when an image is formed of various colors, if the colors are properly mixed, the colors may be seen like one color. For example, blue colors and red colors are properly mixed in an image region, the thusly mixed colors may be seen like a purple color; Even when the colors are nor properly mixed, in this case, when an image is formed of similar colors, one color among the above-described colors may be designated as a representative color. When the thusly designated representative color may represent the image, the reliability with respect to the representative color is enhanced. For example, even when various yellow color groups are not properly mixed, a certain yellow color group may be designated as a representative color.

Therefore, in the present invention, the reliability is set based on a value which is determined in accordance with the mixed rate and color similarity of the colors in the image region. The method for obtaining the reliability will be explained later with reference to FIGS. 2 through 8. When expressing the representative color value of the image region with the reliability, the representative color value may be used for searching the images based on the weights. In addition, it is possible to perform a color segmentation using the reliability. The description thereon will be provided later with reference to FIGS. 11 through 15.

Two methods are disclosed for obtaining a reliability in the present invention. One method is directed to removing a mixed element based on an averaging process of the image region and obtaining a reliability in accordance with the color similarity. The other method is directed to obtaining an accurate value of the mixed rate and obtaining a reliability based on the color similarity.

Figure 2:
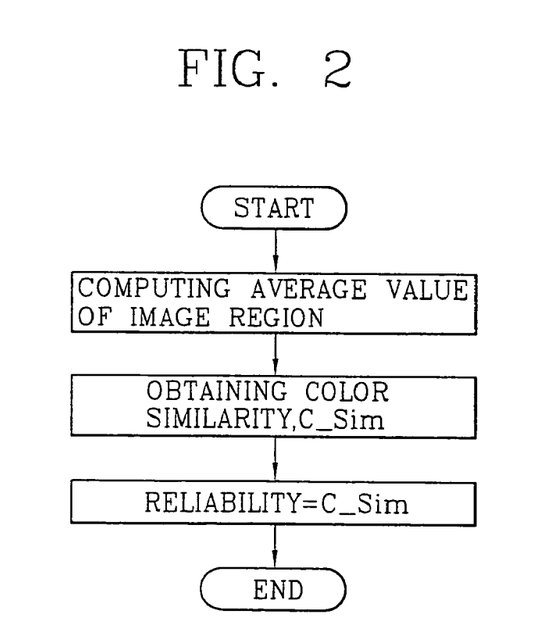
FIG. 2 is a flow chart of a method for obtaining a reliability using a color similarity according to the present invention.

The first embodiment of the present invention for obtaining a reliability of the image region will be explained with reference to FIGS. 2 and 3. The mixed element is removed by the averaging process of the image region, and then the reliability is obtained based on the color similarity.

In the embodiments of the present invention, the image region is assumed as a rectangular region. Otherwise, the above-described methods possibly be adapted by considering the boundary portion.

The image region is changed to an image having a lower resolution. At this time, an average value of the n×n square pixel color values is obtained, and the n×n square pixels are changed to one pixel having an average color value, or the image region is filtered using the n×n average filter to obtain the same result. In the earlier method, errors occur, but the processing speed is fast. In the later method, the values are accurate but the processing speed is slow.

When performing the averaging process, the number of colors existing in the image region is decreased after the averaging process, so that any effects of the mixed elements are removed.

In the first embodiment of the present invention, the color similarity C-Sim is obtained after the averaging process is performed, and the thusly obtained value is set as a reliability value of the image region, and then the reliability is obtained.

The method for obtaining the color similarity C-Sim will be explained with reference to FIG. 3.

First, an average color value is obtained with respect to all pixels of the image region. A hue (Hue_av), light (L_av), chrominance (Ch_av) are obtained with respect to the average color. In addition, all color pixels of the image region are changed to hue, light, chrominance elements, and then the average of the hue, light, chrominance elements is obtained. In this case, a result thereof is same.

The hue, light, chrominance elements with respect to the average color of the image region are obtained, and then the color of each pixel is changed into hue($H\_i$), light($L\_i$), chrominance($Ch\_i$) elements with respect to each pixel Pi of all pixels, and the distance (hereinafter color difference) in a color coordinate space is obtained between the values ($H\_i$, $L\_i$, $Ch\_i$) and the average values ($H\_av$, $L\_av$, $Ch\_av$), and the color differences are summed up to the last pixel.

The thusly summed color difference becomes sum of all the color difference value between each pixel and an average color. The summed color difference value is normalized to 0 through 1, and a result value obtained by subtracting the normalized value from 1 becomes a color similarity C_Sim.

In the first embodiment of the present invention, the thusly obtained color similarity value C-Sim is the reliability. Here, any color coordinate spaces which is used for obtaining the color similarity C-Sim may be available. As the color coordinate space is uniformly changed along with the human color perception, the value obtained based on the color coordinate space becomes a relatively accurate value.

Next, the second embodiment of the present invention for obtaining a reliability will be explained with reference to FIGS. 4 through 6. In the second embodiment of the present invention, an accurate value of the mixed rate is obtained, and then the reliability is obtained based on the color similarity.

Figure 4:
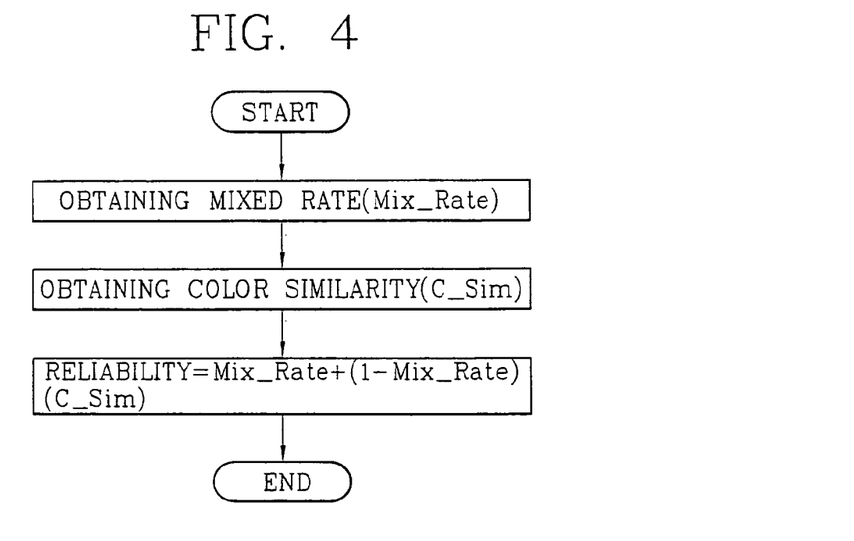
FIG. 4 is a flow chart of a method for obtaining a reliability using a mixed rate and color similarity according to the present invention.

FIG. 4 is a view illustrating a method for obtaining a reliability based on a mixed rate Mix_Rate and a color similarity C_Sim. The reliability is represented as follows:

$$\text{Reliability}=\text{Mix\_Rate}+(1-\text{Mix\_Rate})(\text{C\_Sim}) \quad (1)$$

where Mix_Rate is a value between 0 and 1.

Namely, the value of the mixed rate Mix_Rate becomes 1, the reliability of Equation 1 is determined by the Mix_Rate, and as the Mix_Rate becomes 0, the reliability of Equation 1 is determined by the color similarity C_Sim. In other words, as the mixed rate of the color in the image region is increased, it means that the colors are uniformly distributed, and the color of the region may be visually recognized as one color by human eyes. In this case, the reliability of the representative color value is largely affected by the mixed rate Mix_Rate, and as the mixed rate of the colors is decreased, the reliability of the representative color value is largely affected by the color similarity C_Sim.

Figure 3:
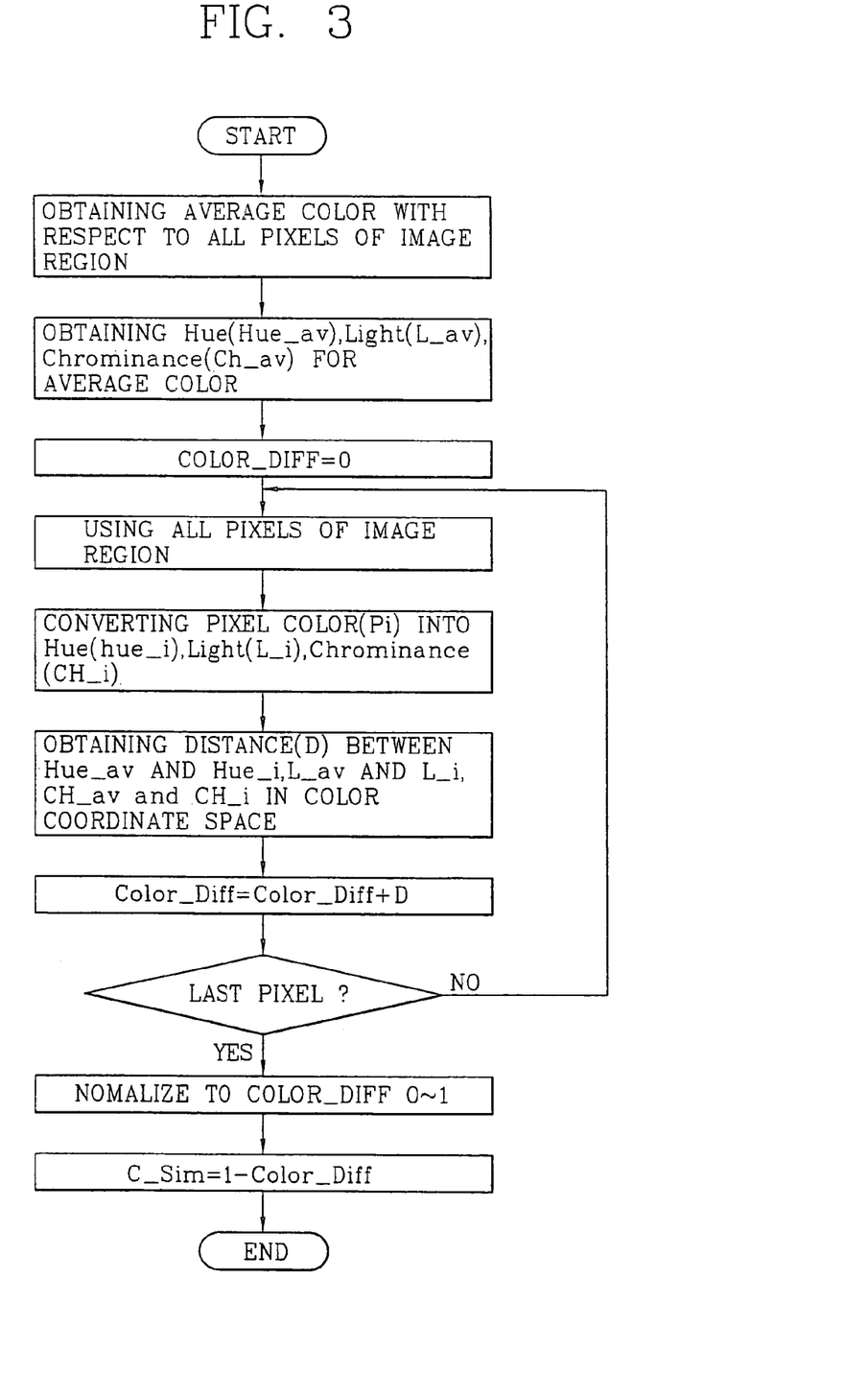
FIG. 3 is a flow chart of a method for obtaining a color similarity according to the present invention.
Figure 5:
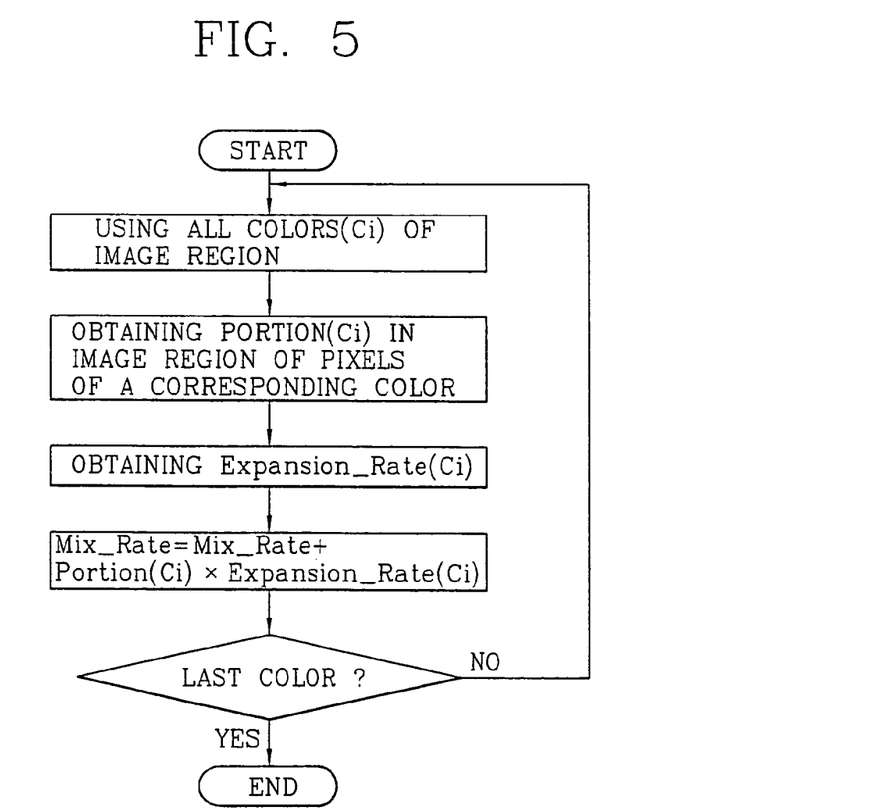
FIG. 5 is a flow chart of a method for obtaining a mixed rate according to the present invention.
Figure 6:
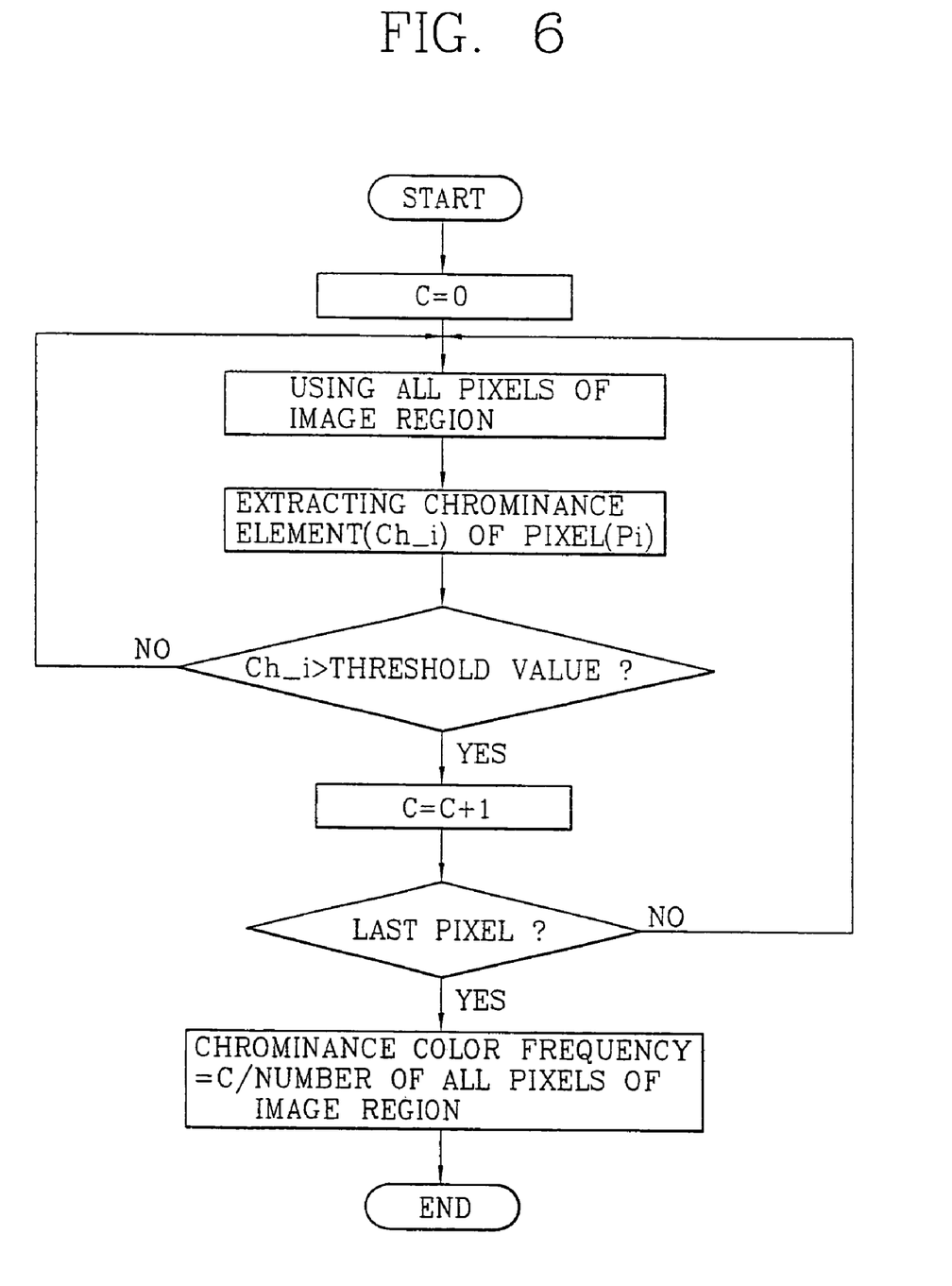
FIG. 6 is a flow chart of a method for obtaining a frequency of a color pixel which has a chrominance exceeding a certain threshold value in an image region according to the present invention.

The color similarity C_Sim is obtained by the method as shown in FIG. 3, and as shown in FIG. 5, the mixed rate of the colors Mix_Rate is obtained using a ratio that each color occupies in the image region with respect to all colors of the image region and an expansion rate which represents that each color is mixed with other colors.

The method for obtaining the mixed rate of the colors will be explained with reference to FIG. 5.

The portion Ci that the pixel having each color Ci occupies in the image with respect to all colors in the image is obtained. For example, in the case of a red color, the portion (Red)=(the total number of pixels of the red color)/(the total number of the pixels in the image). Thereafter, the expansion rate Ci is obtained with respect to each color. Results obtained by multiplying two values with respect to all colors in the image are summed for thereby obtaining the mixed rate Mix_Rate of the colors as follows:

Namely, the mixed rate $$\text{Mix\_Rate} = \sum_{i=1}^{n} \text{Portion}(Ci) \times \text{Expansion\_Rate}(Ci) \quad (2)$$

where n represents the total number of colors in the image.

The method for obtaining the expansion rate with respect to each color in the image region will be explained with reference to FIGS. 7 and 8. The expansion rate Ci with respect to each color Ci is obtained as follows.

$$\text{Expansion\_Rate}(Ci)=\text{Expansion}(Ci)/\text{Max\_Expansion}(Ci)$$

where Max_Expansion(Ci) represents the maximum expansion value determined based on an esize and the image region as follows, and the esize represents a value which is in proportion to the size of the expansion mask.

Max_Expansion($Ci$)=$ME(Ci)$; if $Me(Ci)$<the size of the image region

Max_Expansion($Ci$)=the size of the image region; if $ME(Ci) \geqq$ the size of the image region.

$ME(Ci)=(4esize^2+4esize+1)\times$(the number of the pixels having the color Ci in the image region), where esize= (Width of Expansion_Mask−1)/2, and the width(=height) of the Expansion_Mask is an odd number.

The esize is a value proportional to the size of the expansion size and a value for obtaining the degree of the effect that a certain pixel influences.

The Expansion(Ci) is obtained by the following sequence.

(a) The esize is determined. Here, the esize is a value proportional to the size of the Expansion_Mask (701 of FIG. 7, and 801 of FIG. 8) and represents a degree of a range that a certain pixel influences.

(b) The number of the pixels having a corresponding color Ci in the image region is obtained.

Figure 7:
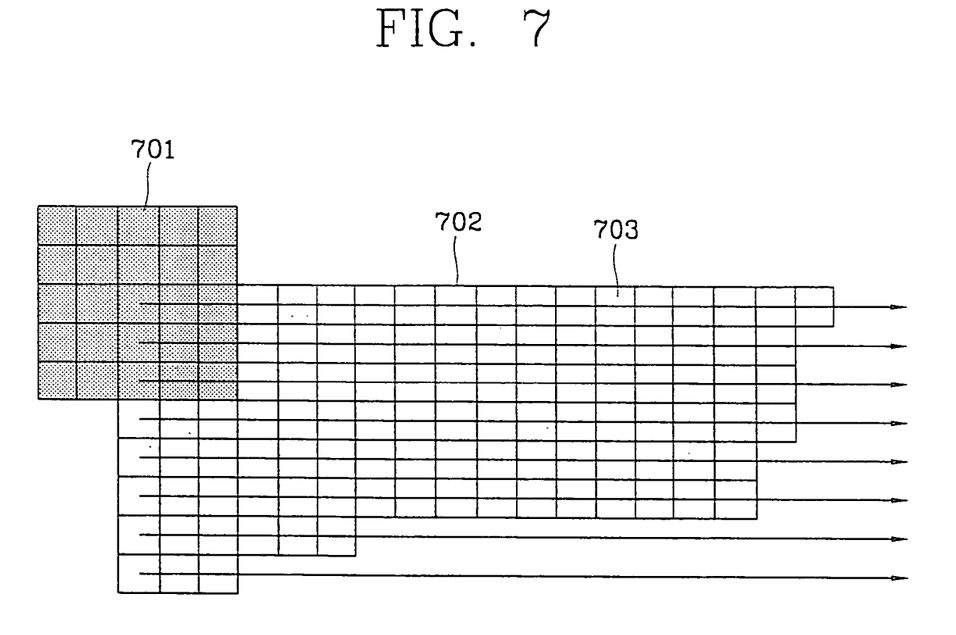
FIGS. 7 and 8 are views illustrating an example of a method for searching a presence of a corresponding color by adapting an expansion mask to an image region for thereby obtaining a mixed rate according to the present invention.
Figure 8:
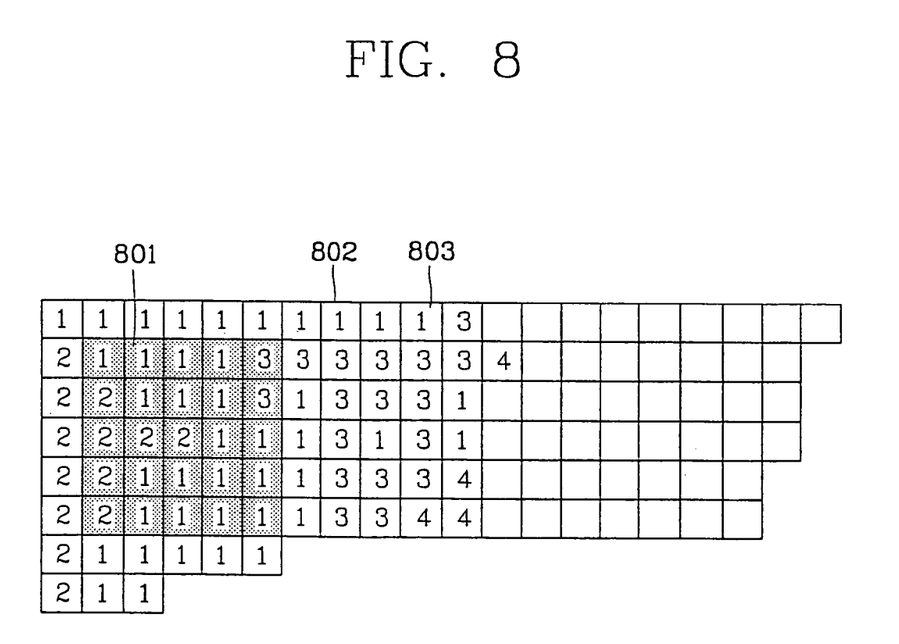

(c) The expansion_Mask is overlapped with respect to all pixels in the image region, and it is searched whether or not corresponding color exists in the mask, and a mask center cell is a corresponding color as shown in FIGS. 7 and 8. If a corresponding color does not exist in the mask, and the mask center cell does not have a corresponding color, the expansion(Ci) value is increased by +1. For example, in the FIG. 8 in the case that the expansion is obtained with respect to the color representing as "C3", since the center cell of the mask is not the color "C3", and the color "C3" exists in the remaining mask regions except for the center cell of the mask, +1 is added to the Expansion(C3) value.

(d) The above-descried operation is performed with respect to all image regions, and the Expansion(Ci) obtained as a result of the above-described operation is added to the number of the pixels having a corresponding color for thereby finally setting the Expansion(Ci) value.

FIG. 7 is a view in which the Expansion_Mask 701 having the width and height of 5 and the esize of 2 is moved at every one pixel 703 in the image region, and FIG. 8 is a view in which the Expansion_Mask 801 is adapted to one pixel 803 in the image region 802. The numerals indicated in each pixel represent the color value of each pixel.

When the Expansion_Rate, Mix-Rate, color similarity values are obtained, it is possible to obtain a reliability as shown in FIG. 4.

The method for designating a representative color using the thusly obtained reliability will be explained with reference to FIG. 9.

The reliability value obtained by the method as shown in FIGS. 2 through 8 is compared with a threshold value (hereinafter, called as a threshold value 1). As a result of the comparison, if the reliability value is larger than the threshold value 1, namely, if it is possible to express the image region using one representative value, the average of all color values of the image region is designated as a representative color value.

However, if the reliability is smaller than the threshold value 1, designating the average color of the image region as a representative color of the region is inaccurate, another method is adapted.

In the case that the reliability is smaller than the threshold value 1, a frequency of the pixels in which the chrominance exceeds a certain level in the image region is obtained. The method for obtaining the frequency of the pixels which have a chrominance exceeding a certain degree is shown in FIG. 6. As shown in FIG. 6, a chrominance element is extracted from each pixel with respect to all pixels in the image region, and then the number of the pixels having a chrominance exceeding a certain level is obtained, and the number of the pixels is divided by the number of the pixels in all image regions for thereby obtaining a frequency (hereinafter called as a chrominance color portion) of the pixels having a chrominance exceeding a certain degree. As a result of comparing the chrominance color portion with a certain threshold value (hereinafter called as a threshold value 2), if the chrominance color portion is smaller than the threshold value 2, it means that a clear color which represents an image region does not exist. Therefore, the average color of the image region is designated as a representative color.

As a result of the comparison, if the chrominance color portion is larger than the threshold value 2, it means that a clear color which is a representative of the image region exists, the representative color is designated as follows.

A hue element is extracted from the color of each pixel with respect to all pixels of the image region, and then is quantized for thereby forming a HUE histogram. The HUE histogram is formed by a descending series, and then the bin value is summed in the bin sequence having the larger values. The summing operation is performed until the summed value exceeds a certain threshold value (hereinafter called as a threshold value 3). When the summed result is larger than the threshold value 3, the color set corresponding to the summed bin is assumed as a HUE_SET, and an average of the pixel values in a corresponding image is obtained. The thusly obtained value is designated as a representative color.

Figure 9:
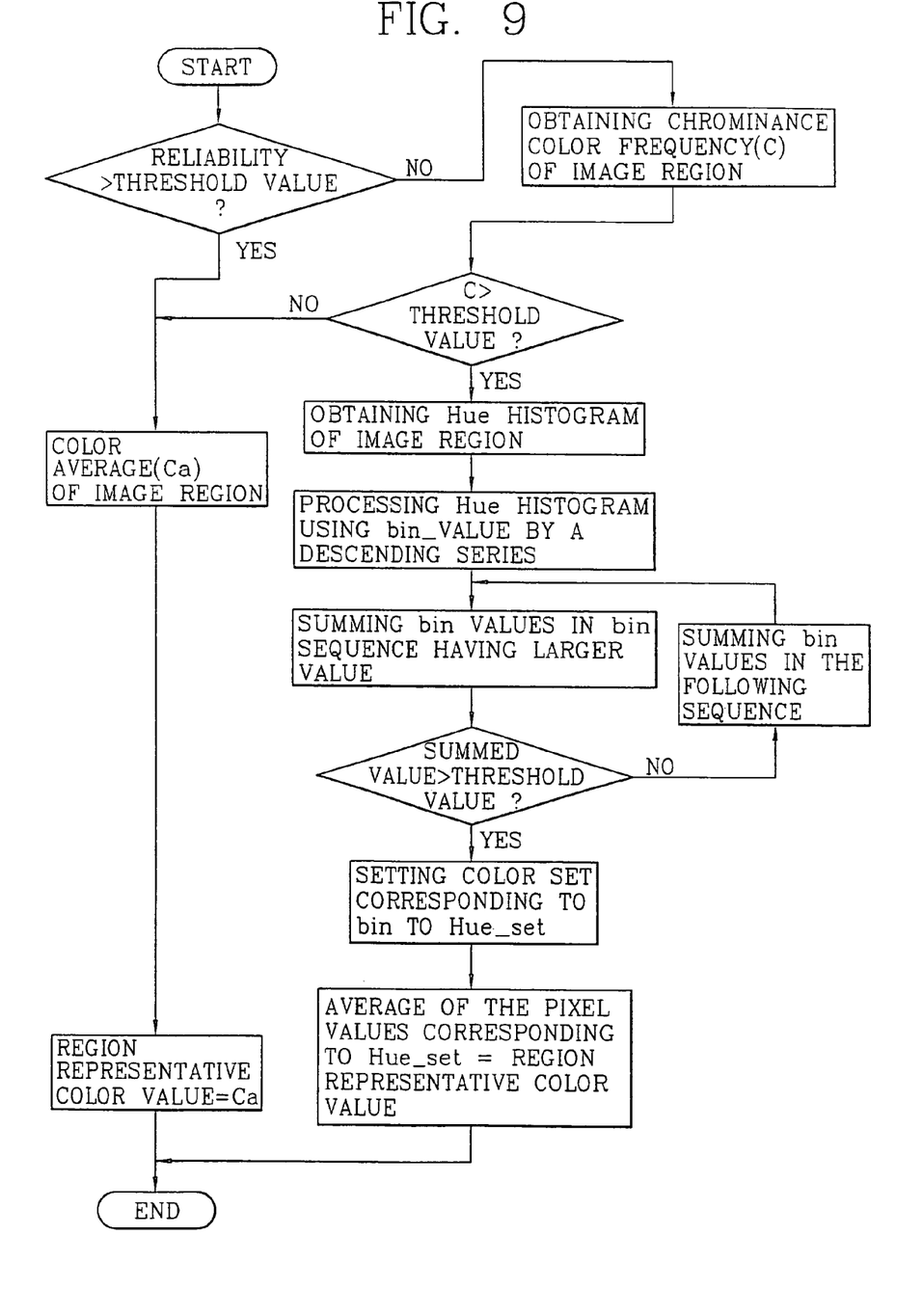
FIG. 9 is a flow chart of a method for designating a representative color value using a reliability according to the present invention.
Figure 10:
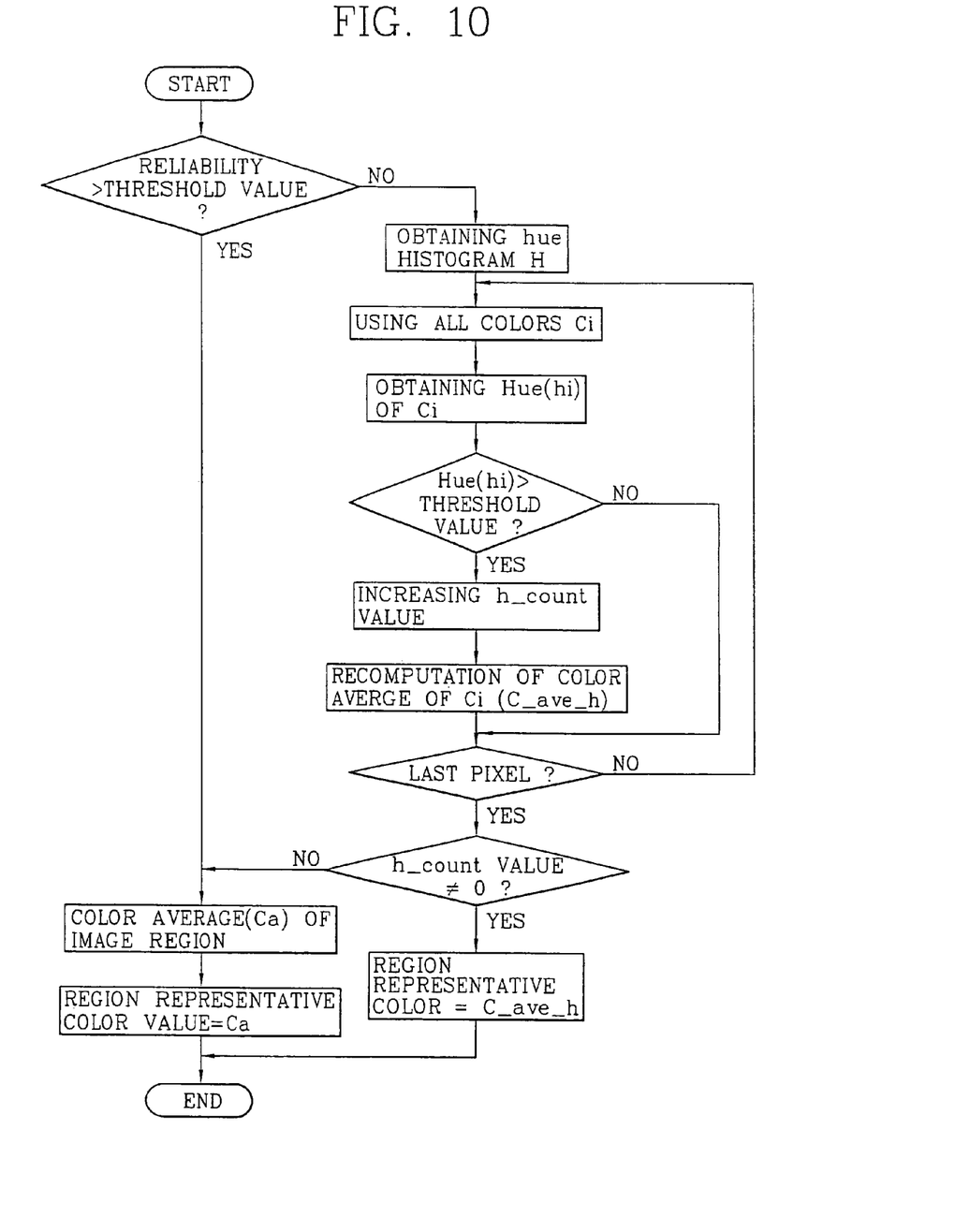
FIG. 10 is a flow chart of a method for designating a representative color value using a reliability in an image region according to the present invention.

FIG. 10 is a flow chart of a method for designating a representative color value using a reliability which is different from the embodiment of FIG. 9. This method will be explained. If the reliability is smaller than the threshold value 3, a hue histogram is obtained, and the above-described process is performed with respect to all colors Ci. The hue(hi) of a certain color Ci is obtained, and the cases that the thusly obtained hue(hi) is larger is counted, and then the average value C av h of the color Ci is computed. The above-described operation is repeatedly performed until the final pixel in the image. When the final pixel is computed, in the case that there is not a hue(hi) value which is larger than a threshold value 4, namely, in the case that the count value is 0, the value obtained by averaging all colors in the image region is designated as a representative value. In the case that the count value is not 0, namely, if there is at least one hue(hi) value larger than the threshold value 4, the average value of the colors having a hue(hi) value larger than the threshold value 4 is designated as a representative color with respect to the region.

Figure 11:
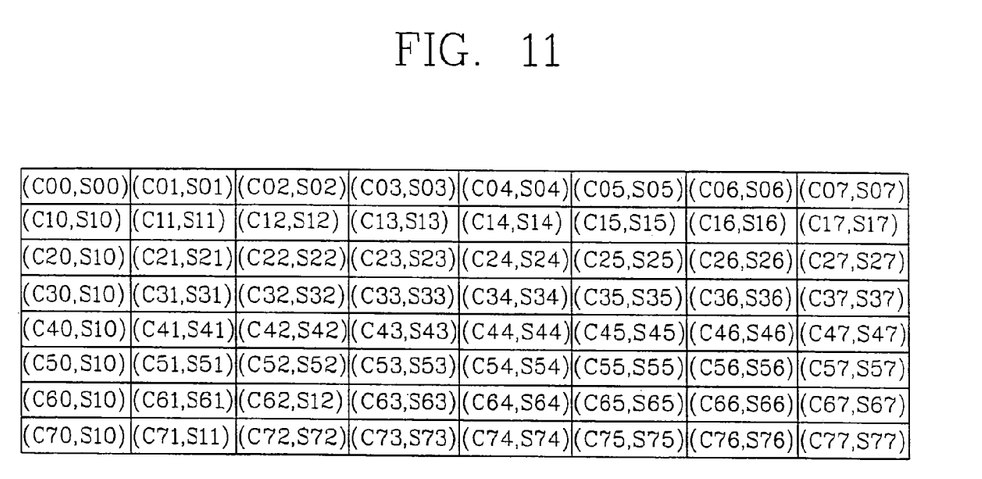
FIG. 11 is a view illustrating a result (data structure) of a representative color designation of an image region expressed together with a reliability according to the present invention.

FIG. 11 is a view illustrating a representative color expression method of a 8×8 grid region formed of 64 local cells which are expressed by a reliability with respect to the representative color value in the image region. Namely, a color information is expressed based on a representative color value Cij and a reliability Sij of the local cell.

Figure 12:
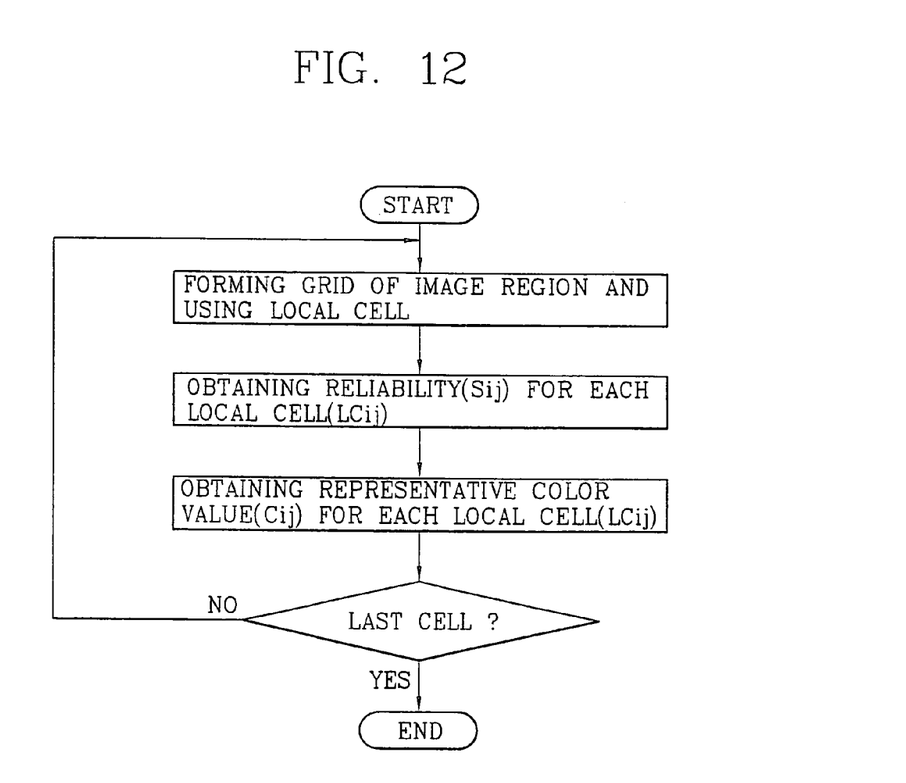
FIG. 12 is a flow chart of a method for setting a representative color value and a reliability of each cell of a grid of an image region according to the present invention.

FIG. 12 us a view illustrating a sequence for segmenting an image region into grids and designating a representative color value with respect to each local cell. It is possible to implement a reliable image processing by segmenting an image region into local cells and expressing a reliability as well as a representative color which is expressed as a representative cell with respect to each local cell.

Figure 13:
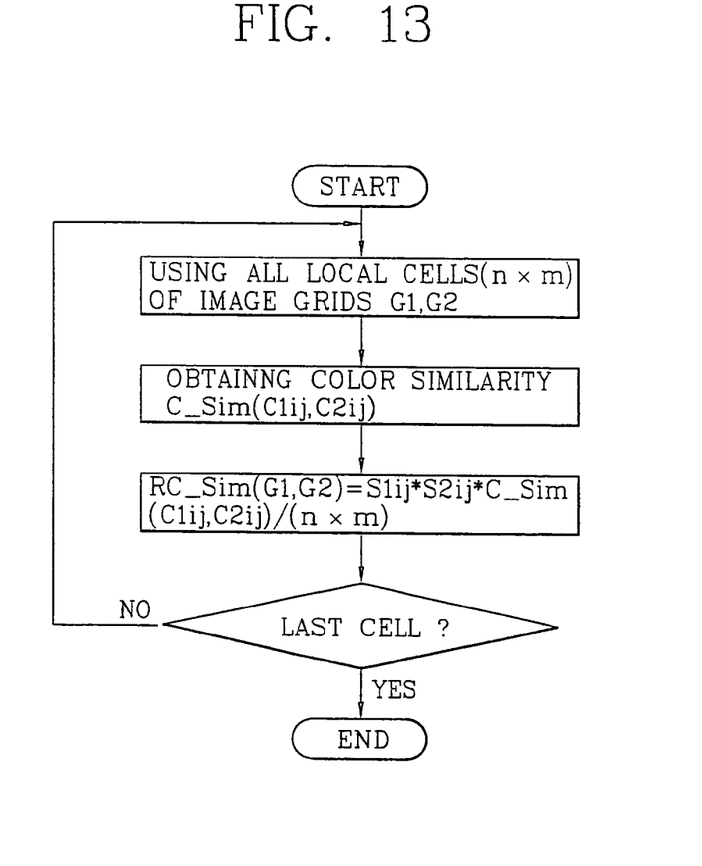
FIG. 13 is a flow chart of a method for obtaining a color similarity between two image grids with respect to two regions according to the present invention.

FIG. 13 is a view illustrating an adaptation of the method of FIG. 12 and a comparison by segmenting the images G1 and G2 into grids as shown in FIG. 11 and expressing a representative color and reliability with respect to each local cell when comparing two images G1 and G2 having a n×m size.

Namely, the color similarities C_Sim(C1ij, C2ij) and reliability S1ij, S2ij of the local cells corresponding to each local cell of the images G1 and G2 are obtained, and the similarities RC_Sim(G1, G2) of two image regions G1, G2 are determined by multiplying the color similarity and reliability. Here, C1ij represents a representative color value with respect to the local cell (i,j) of the image G1, and S1ij represents a reliability with respect to the representative color of the local cell (i,j). In addition, in the color similarities C_Sim(C1ij,C2ij), the local cell (i,j) of the image G1 and the local cell (i,j) of the image G2 may be expressed as a distance difference in the color coordinate space between C1ij and C2ij. Any type of color coordinate space may be used. As the color coordinate space is uniformly changed, the value obtained based on the color coordinate space becomes accurate.

The similarities RC_Sim(G1, G2) between two image regions G1 and G2 having a n×m size may be obtained based on a weight in accordance with a reliability value. The following is an example of the above-described method.

$$RC\_Sim(G1, G2) = \left\{ \sum_{i=1}^{n} \sum_{j=1}^{m} [a \times S1ij \times S2ij \times C\_Sim(C1ij, C2ij) + b \times (1 - (S1ij - S2ij))^2 / [(n \times m) \times (a + b)] \right\}$$

where a, b represent weights based on a reliability, and it is possible to obtain a similarity between two image regions by adjusting the values a and b.

Next, the method that a color segmentation is performed for segmenting the region formed of the same colors using the reliability will be explained.

It is possible to perform a color segmentation using the reliability by recognizing the case that the value of the reliability exceeds a certain level as the same color even when the colors are not the same.

Figure 14:
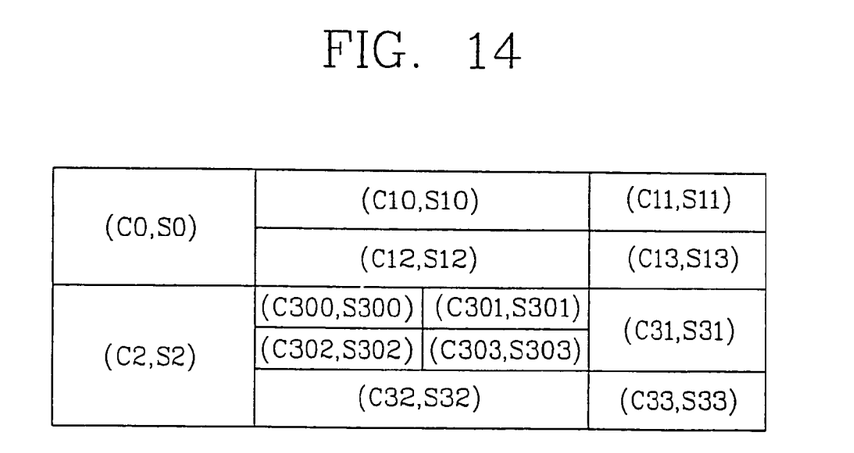
FIG. 14 is a view of a result of a representative color designation of an image region which is expressed by a reliability together with a representative color value having a certain degree reliability according to the present invention.
Figure 15:
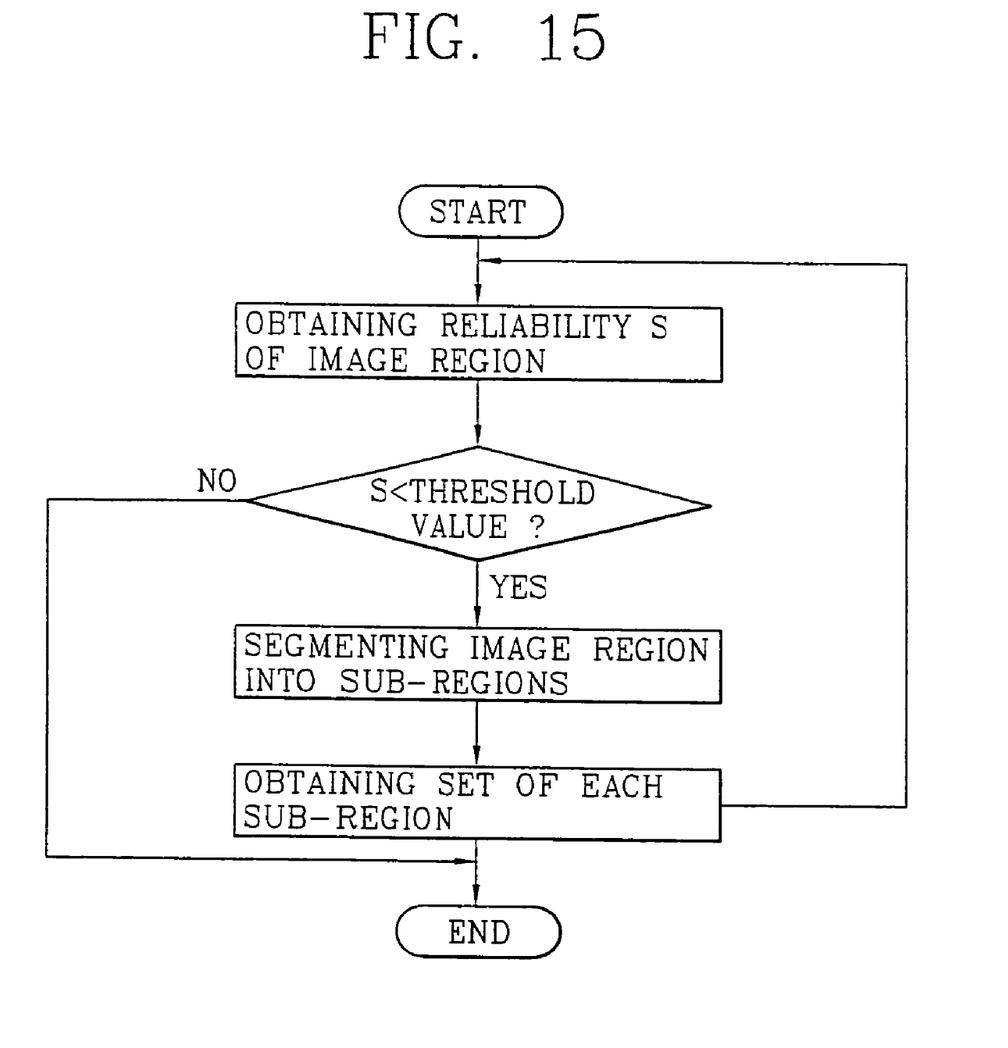
FIG. 15 is a flow chart of a method for obtaining a similarity region in which an image region is properly segmented using a reliability according to the present invention.

FIG. 15 illustrates the above-descried color segmentation method, and FIG. 14 illustrates a quad tree for dividing the image into four parts.

Namely, the reliability of the image region is obtained, and the image region in which the reliability is below a certain threshold value (hereinafter called as a threshold value 5) is segmented into four parts for thereby obtaining a representative color and reliability.

The reliability of each of divided four region is compared with the threshold value 5, and the region having a threshold value below 5 is segmented into four parts. The above-described operation repeatedly performed until the reliability of all regions exceed 5. Therefore, in this case, since all segmented regions have a reliability of above 5, the above-descried sub-regions may be recognized as one color.

In other words, the entire images or a certain region designated by a user are expressed by a quad tree method, and each region of the quad tree is expressed as a representative color and reliability. The above-described quad tree type region segmentation is repeatedly performed until all regions have a threshold value above a certain degree.

As described above, in the present invention, the representative color value of the image region is expressed together with the reliability, so that the weight is determined based on the reliability during the image search. When measuring the color similarity between two images, it is possible to accurately measure the color similarity using the reliability for thereby enhancing an image search performance.

In addition, in the present invention, the representative color values of the image region are expressed together with the reliability, so that it is possible to more effectively perform a color segmentation in accordance with the degree of the reliability when performing a color segmentation in which the image region is segmented into sub-regions for thereby displaying the colors based on the same color.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In a method using a color value as information with respect to an image region, a representative color designating method, comprising:

determining a representative color value in a color space that represents the image region; and expressing a reliability of the representative color value as color information of the image region together with the representative color value that represents the image region, wherein said reliability is directed to a degree that one image region is expressed by at least one color that represents said one image region, and wherein said reliability comprises a proportion of pixels that a certain color occupies in said image region and a degree to which said certain color pixels are adjacent to each other.

2. In a method using a color value as information with respect to an image region, a representative color designating method, comprising:

determining a representative color value in a color space that represents the image region; and expressing a reliability of at least one representative color value as color information of the image region together with the at least one representative color value that represents the image region, wherein said reliability is directed to a degree that one image region is expressed by at least one color that represents said one image region, and wherein said reliability comprises a calculation determining an amount that pixels of at least one color are mixed with other colors in said one image region.

3. In a method for using a color value as an information with respect to an image region, a local representative color designation method, comprising:

segmenting an image region into n×m local regions; and expressing a reliability of at least one representative color as a color information of each segmented local region together with the at least one representative color that represents said each segmented local region, wherein said reliability is directed to a degree that one image region is expressed by at least one color that represents said one image region, and wherein said reliability comprises information representing an accuracy of the at least one representative color value representing the one image region and whether pixels of the at least one color in the one image region express a connected color.

* * * * *